Dec. 17, 1968  F. J. BANOVIC  3,417,334
POWER SUPPLY FOR TRANSISTORIZED CLOCK RADIO
Filed May 5, 1967
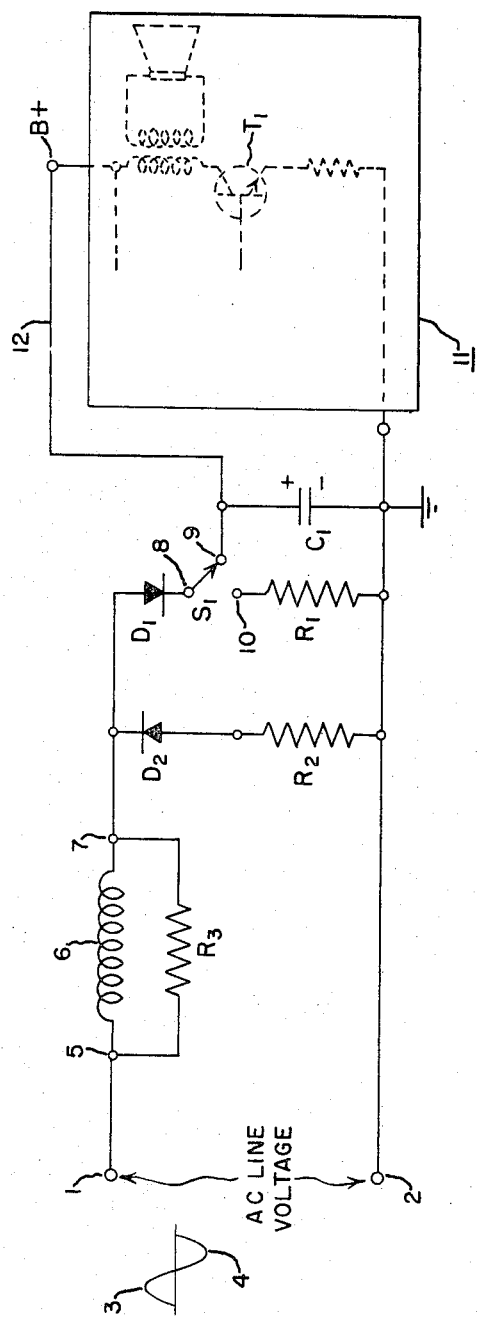
INVENTOR:
FRANK J. BANOVIC,
BY William S. Wolfe
HIS ATTORNEY.

United States Patent Office 3,417,334
Patented Dec. 17, 1968

3,417,334
POWER SUPPLY FOR TRANSISTORIZED CLOCK RADIO
Frank J. Banovic, Utica, N.Y., assignor to General Electric Company, a corporation of New York
Filed May 5, 1967, Ser. No. 636,337
7 Claims. (Cl. 325—492)

ABSTRACT OF THE DISCLOSURE

A power supply for transistorized clock radio wherein the clock motor field winding and the radio circuitry are connected in series across a source of AC line voltage during half cycles of a desired polarity of the line voltage.

Background of invention

In a prior art transistorized clock radios, the clock motor field winding was connected directly across the source of AC line voltage. In such radios, a relatively expensive power transformer was generally employed to reduce the line voltage to the relatively low level required for operating the transistorized radio circuitry. Alternatively, voltage dropping resistors were employed to decrease the voltage to the required low level, the use of such resistors resulting in relative inefficiency and the generation of undesired heat. Another approach was to employ relatively expensive, high voltage transistors in the output stage of the radio, the operating voltage being applied to the earlier stages through suitable voltage dropping resistors.

The problems associated with each of the prior art approaches were magnified where the radio was to operate from a 220 volt line since the voltage reduction required was even greater.

Summary

Accordingly, it is an object of the present invention to provide an improved power supply for a transistorized clock radio whereby the prior art power transformer is obviated.

A further object is to provide a power supply for a transistorized clock radio particularly suited for operation from a 220 AC volt line.

These and other objects are achieved in one embodiment of the invention by connecting the clock motor field winding and the radio circuitry in series across the source of line power during half cycles of a desired polarity of the line voltage. The clock motor field winding thus serves to reduce the line voltage to the lever required for operation of the transistors of the radio circuitry. The motor field winding is connected to the radio circuitry through a unidirectional conducting device poled so as to provide a pulsating DC operating voltage of the desired polarity. A second inversely poled unidirectional conducting device is connected between the motor field windings and the low side of the line to provide a current path for opposite polarity half cycles of the line voltage. A switch is interposed between the first unidirectional conduction device and the radio circuitry so that the operating voltage can be removed from the radio's circuitry when desired, a resistance approximating the impedance of the radio circuitry being alternatively switched into the circuit to complete the current path.

Detailed description

The novel and distinctive features of the invention are set forth in the appended claims. The invention itself, together with further objects and advantages thereof, may best be understood by reference to the accompanying drawing in which:

The single figure is a schematic diagram of the power supply in accordance with the invention.

As depicted, the AC line voltage is applied across a pair of input terminals 1 and 2, the line voltage including positive and negative half cycles 3 and 4 respectively.

The terminal 2 is grounded, whereas the terminal 1 is connected to the first terminal 5 of the clock motor field winding 6. The clock motor is adapted to drive the hands of a clock (not shown) in conventional fashion and initiate desired switching operations for the radio through a suitable timer mechanism (not shown).

The second terminal 7 of the motor field winding 6 is connected to the anode of a first unidirectional conducting device shown as a diode $D_1$, the cathode of the diode being connected to the common contact 8 of a single pole, double throw switch $S_1$. The switch $S_1$ alternatively connects common contact 8 to contacts 9 and 10. The switch $S_1$ can be actuated by the aforementioned timer mechanism in conventional fashion.

The contact 9 is connected to the radio circuitry generally indicated at 11 via a line 12 to apply a DC operating voltage thereto. An electrolytic capacitor $C_1$ is connected between the line 12 and ground to perform a conventional filtering operation.

For purposes of illustration, the radio circuitry 11 is shown including in dotted lines an audio output stage including a transistor $T_1$ to the collector of which is applied the DC operating voltage in conventional fashion.

The contact 10 of switch $S_1$ is connected via a resistor $R_1$ to ground in order to provide a current path for positive half cycles of the line voltage when operating voltage is removed from the receiver circuitry 11.

Thus, a first series circuit is defined comprising the source of AC line voltage, the clock motor field winding 6, the diode $D_1$ and alternatively the radio circuitry 11 or resistor $R_1$.

The second terminal 7 of the motor field winding 6 is also connected to the cathode of a second unidirectional conducting device shown as diode $D_2$, the anode of the diode being connected via a resistor $R_2$ to ground.

Thus, a second series circuit is defined comprising the source of AC line voltage, the clock motor field winding 6, the diode $D_2$ and resistor $R_2$.

As depicted, a resistor $R_3$ can be positioned in shunt with the motor field winding 6 in order to shunt a portion of the current around the motor field winding.

The operation of the power supply depicted in the figure is such that during positive half cycles 3 of the AC line voltage, current flows through the motor field winding 6, the diode $D_1$ and the radio circuitry when the switch $S_1$ is in the position as shown. Thus, a positive pulsating DC operating voltage, filtered by the action of the capacitor $C_1$ is applied to the radio circuitry to operate the radio circuitry 11 in the desired fashion.

With the switch $S_1$ in the alternative position whereby contact 8 is connected to contact 10, the operating voltage thus being removed from the receiver circuitry 11, the current path for the motor field winding 6 is completed through the resistor $R_1$. Preferably, the resistor $R_1$ is of a value chosen to approximate the impedance of the radio circuitry 11 so that the field winding current does not differ significantly in the two switch positions.

During negative half cycles 4 of the AC line voltage, the circuit path for the motor field winding 6 is from the terminal 2 through resistor $R_2$ and diode $D_2$ to the winding 6 and subsequently terminal 1.

In this manner, current flows in the motor field winding during both positive and negative half cycles of the AC line voltage in the desired fashion.

The resistor $R_2$ is preferably selected to be of a value similar to that of resistor $R_1$ so that the current to the motor field winding is substantially the same on negative and positive half cycles of the line voltage. However, it is found that with conventional clock motors, the current during positive and negative half cycles can be allowed to vary considerably so that in some instances the resistor $R_2$ can be eliminated completely, the anode of the diode $D_2$ being connected directly to ground.

Further, the resistor $R_1$ can be eliminated in those situations where variation in the current in the clock motor winding between the two switch positions is tolerable. Similarly, the resistor $R_3$ is required only in those instances where it is desired to shunt a portion of the current around the motor field winding 6.

Thus, in accordance with the invention the motor field winding 6 itself serves to reduce the line voltage to the required level. The winding defines a voltage divider wtih the radio receiver circuitry to apply the desired operating voltage to the receiver circuitry. In ths manner, the necessity for the use of a power transformer or related techniques is eliminated.

The power supply of the invention may be utilized for 110 volt AC line voltages in which instance a clock motor operating at something less than the full 110 volt line voltage is utilized. Further, the power supply of the invention is particularly suitable for operation from 220 volt line voltage in which instance a standard 110 volt motor can be employed.

In one particularly successful embodiment of the invention, the following components and circuit values were employed for radio receiver circuitry requiring a DC operating voltage of 95 volts and a corresponding current drain of 42 milliamps.

| | |
|---|---|
| Motor | Telechron type 4410–001–01B |
| AC line voltage | volts__ 220 |
| $D_1$ and $D_2$ | GE A–14 |
| $R_1$ | ohms__ 1500 |
| $R_2$ | do____ 1500 |
| $R_3$ | do____ 2000 |
| $C_1$ | μf__ 100 |

Although the invention has been described with respect to certain specific embodiments, it will be appreciated that modifications and changes may be made by those skilled in the art without departing from the true spirit and scope of the invention. For example, it will be appreciated that the power supply of the invention may be utilized to provide a negative DC operating voltage by simply reversing the polarities of the diodes $D_1$ and $D_2$.

What is claimed and desired to be secured by Letters Patent of the United States is:

1. A power supply for supplying a DC operating voltage from a source of AC voltage to the circuitry of a transistorized radio having a clock motor including a motor field winding, said power supply comprising:
   (a) a first series circuit including a first unidirectional conducting device serially connected with the radio circuitry, the source of AC voltage and the motor field winding, and
   (b) a second series circuit including a second unidirectional conducting device inversely poled with respect to said first device and serially connected with the source of line voltage and the motor field winding.

2. The power supply defined in claim 1 wherein said first series circuit includes switch means for alternative removal of said radio circuitry from said first series circuit.

3. The power supply defined in claim 2 including a resistive element serially connected in said first series circuit by said switch when said radio circuitry is removed therefrom.

4. The power supply defined in claim 3 wherein the impedance of said resistive element is substantially equal to the impedance of said radio circuitry.

5. The power supply defined in claim 1 wherein said second series circuit includes a resistive element.

6. The power supply defined in claim 5 wherein the impedance of said resistive element is substantially equal to the impedance of said radio circuitry.

7. The power supply defined in claim 1 including a resistive element connected in shunt with said motor field winding.

References Cited
UNITED STATES PATENTS

| | | | |
|---|---|---|---|
| 2,771,560 | 11/1956 | Creiman | 325—396 X |
| 2,926,245 | 2/1960 | Denk | 325—396 X |
| 2,999,928 | 9/1961 | Haydon et al. | 325—396 X |
| 3,026,411 | 3/1962 | Beers | 325—396 |

ROBERT K. SCHAEFER, *Primary Examiner.*

T. B. JOIKE, *Assistant Examiner.*

U.S. Cl. X.R.

321—8; 325—396